(12) United States Patent
Wang et al.

(10) Patent No.: US 10,738,436 B1
(45) Date of Patent: Aug. 11, 2020

(54) TUBULAR FOUNDATION FOR ONSHORE WIND TURBINE GENERATORS

(71) Applicants: Dongyuan Wang, Austin, TX (US); Jing Li, Chengdu (CN); Ying Han, Chengdu (CN)

(72) Inventors: Dongyuan Wang, Austin, TX (US); Jing Li, Chengdu (CN); Ying Han, Chengdu (CN)

(73) Assignee: Montana Systems Inc., Rolling Hills Estates, CA (US)

( * ) Notice: Subject to any disclaimer, the term of this patent is extended or adjusted under 35 U.S.C. 154(b) by 0 days.

(21) Appl. No.: 16/278,037

(22) Filed: Feb. 15, 2019

(51) Int. Cl.
| | |
|---|---|
| *E02D 27/42* | (2006.01) |
| *E02D 15/04* | (2006.01) |
| *F03D 13/20* | (2016.01) |
| *E02D 5/34* | (2006.01) |

(52) U.S. Cl.
CPC .......... *E02D 27/425* (2013.01); *E02D 15/04* (2013.01); *F03D 13/22* (2016.05); *E02D 5/34* (2013.01)

(58) Field of Classification Search
CPC ....... E02D 27/42; E02D 15/04; E02D 27/425; E02D 5/58; F03D 13/22; Y02E 10/728
See application file for complete search history.

(56) References Cited

U.S. PATENT DOCUMENTS

| | | | |
|---|---|---|---|
| 1,048,993 A | 12/1912 | Meriwether | |
| 2,347,624 A | 4/1942 | Schwendt | |
| 2,706,498 A | 11/1950 | Upson | |
| 2,724,261 A | 11/1955 | Renssa | |
| 3,186,181 A | 6/1965 | Show et al. | |
| 3,382,680 A | 5/1968 | Takano | |
| 3,600,085 A | 8/1971 | Vanich | |
| 3,842,608 A | 10/1974 | Turzzillo | |
| 3,963,056 A | 6/1976 | Shibuya et al. | |
| 4,228,627 A | 10/1980 | O'Neill | |
| 4,618,287 A | 10/1986 | Kinnan | |
| 4,842,447 A | 6/1989 | Lin | |
| 5,228,806 A | 7/1993 | De Medieros | |
| 5,379,563 A | 1/1995 | Tinsley | |
| 5,586,417 A | 12/1996 | Henderson | |
| 5,826,387 A | 10/1998 | Henderson | |

(Continued)

*Primary Examiner* — Brian E Glessner
*Assistant Examiner* — Daniel J Kenny
(74) *Attorney, Agent, or Firm* — J.H. Lin Patent Law P.C.; John H. Lin

(57) ABSTRACT

Embodiments of the present foundation for wind turbine generators comprise four structural members: a relatively long central hollow pier, several arm grade beams, a continued grade beam and a continued shear key. The central hollow pier positions in the center of the foundation system, arm grade beams are arranged evenly in radial direction and extend from the pier to the continued grade beam. Continued grade beam is arranged circumferentially in outer periphery and the continued shear key is built below it. Arm grade beams have a varied section with the far end embedding into ground. The top of the continued grade beam matches the top of arm grade beams, while the continued shear key embeds deeper into ground. All structural members are constructed of cast-in-place concrete reinforced with rebars, and all connections are fixed and rigid. The present foundation uses the ground to shape and form the structural members, no formwork, backfilling and compaction is needed.

6 Claims, 8 Drawing Sheets

(56) References Cited

U.S. PATENT DOCUMENTS

| | | | |
|---|---|---|---|
| 7,533,505 B2 | 5/2009 | Henderson | |
| 7,987,640 B2 | 8/2011 | Ollgaard et al. | |
| 8,161,698 B2 | 4/2012 | Migliore | |
| 8,359,798 B2 * | 1/2013 | Armbrecht | E02D 27/425 |
| | | | 52/297 |
| 9,175,493 B2 * | 11/2015 | Zavitz | E04H 12/16 |
| 9,428,877 B2 * | 8/2016 | Clifton | E02D 27/42 |
| 9,534,405 B1 * | 1/2017 | Phuly | F03D 13/22 |
| 9,670,909 B2 | 6/2017 | Holscher | |
| 9,938,685 B2 * | 4/2018 | Krause | E02D 27/425 |
| 10,309,074 B2 * | 6/2019 | Tozer | E02D 27/016 |
| 2007/0181767 A1 * | 8/2007 | Wobben | E02D 27/42 |
| | | | 248/346.01 |
| 2011/0061321 A1 * | 3/2011 | Phuly | E02D 27/42 |
| | | | 52/297 |
| 2019/0323197 A1 | 10/2019 | Huo | |

\* cited by examiner 1-1: See Fig.2 for Section View
2-2: Fig. 4 and Fig.7 for Section View
3-3: See Fig 8. for Section View

TUBULAR FOUNDATION FOR ONSHORE WIND TURBINE GENERATORS

REFERENCES CITED

U.S. Patent Documents

U.S. Pat. No. 1,048,993 Dec. 31, 1912 C. Meriwether
U.S. Pat. No. 2,347,624 Apr. 24, 1942 B. J. Schwendt
U.S. Pat. No. 2,706,498 Nov. 13, 1950 M. M. Upson
U.S. Pat. No. 2,724,261 Nov. 22, 1955 E. M. Renssa
U.S. Pat. No. 3,186,181 Jun. 1, 1965 R. K. Show et al.
U.S. Pat. No. 3,382,680 May 14, 1968 Tamio Takano
U.S. Pat. No. 3,600,085 Aug. 24, 1971 F. Vanich
U.S. Pat. No. 3,842,608 Oct. 22, 1974 L. A. Turzzillo
U.S. Pat. No. 3,963,056 Jun. 15, 1976 A. Shibuya et al.
U.S. Pat. No. 4,228,627 Oct. 21, 1980 J. C. O'Neill
U.S. Pat. No. 4,618,287 Oct. 21, 1986 F. Kinnan
U.S. Pat. No. 4,842,447 Jun. 27, 1989 J. J. Lin
U.S. Pat. No. 5,228,806 Jul. 20, 1993 C. De Medieros
U.S. Pat. No. 5,379,563 Jan. 10, 1995 C. R. Tinsley
U.S. Pat. No. 5,586,417 Dec. 24, 1996 A. Henderson
U.S. Pat. No. 5,826,387 Oct. 27, 1998 A. Henderson
U.S. Pat. No. 7,533,505 May 19, 2009 A. Henderson
U.S. Pat. No. 7,987,640 Aug. 2, 2011 B. Ollggard
U.S. Pat. No. 8,161,698 Apr. 24, 2012 P. G. Migliore
U.S. Pat. No. 9,670,909 Jun. 6, 2017 N. Holscher

BACKGROUND OF THE INVENTION

Technical Field

The presented invention relates to a tubular rivet-like foundation for onshore wind turbine generators. The present invention is applicable to onshore wind energy industry to support wind turbine generators and tubular towers, as well as applicable to civil engineering and other large facility, if supported superstructure has a base flange.

Background of Foundations for Onshore Wind Turbine Generators

Foundations, defined as the engineering structures partially or fully embedded in ground to support superstructure, have been used since the civilization of human beings. Wind energy engineering, civil engineering, and other large facility usually need to build large foundations first to support superstructures. The foundation typically subject to compression loadings, pull-out loadings, overturning moments and fatigue loadings. Loadings from wind turbine generators (WTGs) not only are significant in magnitude, but also have cyclic characteristics as wind directions change periodically, and therefore it is important for WTG foundations to meet specific requirements to ensure the facility safe. Typical requirements for foundations include bearing capacity, settlement, horizontal displacement etc. For WTG foundations, horizontal and rotational stiffness is particularly important to prevent excessive gapping between soils and foundation and the resonance between wind turbine generator and foundation.

Existing foundation types that are widely used in wind industry include inverted T-type spread footings, cap with drilled piers and cap with rock anchors, etc. A connection part is typically designed to connect the foundation to the superstructures supported. For wind turbine generator foundation, anchor bolt system is widely used to connect the base flange of wind turbine tubular tower to the foundation. The ground at foundation bottom provides resistance to the loadings transferred from the superstructure or ground anchors/piles are used to mount/support the foundation. Particularly, the size of foundation supporting the wind turbine generators is considerably large, and the construction cost is approximately $200,000 per foundation. It is not unusual that subsurface conditions impose limitations to construction of the foundation. For example, high groundwater level may bring troubles for excavating the pit for invert T-type foundation, and requires extra measures such as shoring, bracing and dewatering. In addition, excavation will remove the earth surface vegetation, and thus excavation with relatively large footprint will impact on the environment negatively.

The present tubular rivet-like foundation is invented to address the above challenges. The present foundation comprises one relatively long hollow pier positioning in center of the system, one continued grade beam arranged circumferentially in outer periphery with a continued shear key built below it, and several arm grade beams connecting the relatively long hollow pier to the continued grade beam and the continued shear key built below it. A stickup in central hollow pier elevates the foundation from the ground surface. The section of the arm grade beams varies, and the top slopes down into ground from a point offsets approximately 3 feet from the wall of the central hollow pier. The top of the continued grade beam matches the top of the arm grade beams, while its bottom embeds deeper into ground to form the continued shear key. The presented foundation is constructed of cast-in-place concrete reinforced with rebars in different shape, size and grade. All connections for the structural members are fixed and rigid. Moreover, the present foundation utilizes ground to shape and form the comprised structural members, no need for formwork, backfilling and compaction.

Description of Related Art

Various forms of foundations utilizing general structural and function features heretofore have been known. Those included disclosed U.S. Pat. Nos. 1,048,993, 2,347,624, 2,706,498, 2,724,261, 3,186,181, 3,382,680, 3,600,085, 3,842,608, 3,963,056, 4,228,627, 4,618,287, 4,842,447, 5,228,806, 5,379,563, 5,586,417, 5,826,387, 7,533,505, 7,987,640, 8,161,698, 9,670,909 etc. However, these previously invented foundations do not include the forms and features of the instant invention, and the combined forms and features of the instant invention enable the presented invention heavy duty as well as adaptive, constructible and cost-efficient. The invented foundation comprising features disclosed results in fully utilizing the deeper and further ground to resist tremendous overturning moment loadings and enables a high capability of significantly reducing the gapping between soils and foundation.

U.S. Pat. No. 1,048,993 to C. Meriwether discloses a simple and inexpensive construction method of reinforced concrete caisson sunk by a usual way. The caisson may be filled with concrete and then works as a pier. The caisson is pre-casted into tubular sections of concrete, and heavy reinforcements and metal rings which are in a bell and spigot joint are used in section ends. The rod is tensioned and extended through the connecting rings embedded partially inside of the reinforced concrete. The rod works as a tie to connect the embedded rings which are spaced inward of the inner peripheries of the concrete tube and do not embed fully in the concrete wall. The Meriwether's caisson is a concrete pier with relatively large diameter. In contrast, the present foundation comprises a relatively long central hollow pier with a tube-like section constructed in one time, a continued grade beam and arm grade beams which transfer and distribute the loadings to further ground, and a continued shear key built below the continued grade beam. These comprised features and forms result in a surprisingly high capability of significantly reducing the gapping between soils and foundation caused by cyclic wind loadings.

U.S. Pat. No. 2,374,624 to P. J. Schewendt discloses a precast foundation with concrete bolted together intended for supporting transportation signal masts. The foundation embedded in the ground, but the precast sections impose size limitations and thus the foundation can only support light superstructures which subject to relatively small overturning moment. The present foundation has forms and features that the Schewendt's invention does not. Deep embedded central hollow pier, continued grade beam with the continued shear key and arm grade beams, which are simultaneously constructed of cast-in-place concrete reinforced with rebars, enable the present foundation to utilize deeper and further ground to resist tremendous overturning moment loadings from tall superstructures, particularly result in a surprisingly high capability of significantly reducing the gapping between soils and foundation caused by cyclic wind loadings.

U.S. Pat. No. 2,706,498 to M. M. Upson discloses a prestressed tubular concrete structure for use as pipe conduits, piles and caissons. The structural tubular structure is pre-casted and can be assembled one by one with joint means at the end. Tension is applied to the longitudinal reinforcing steel placed in the pre-served holes and grout then is poured to the holes to make the steel and concrete bond tightly. The Upson's structure is pre-stressed reinforced concrete structure and not suitable for use as foundations for wind turbine generators which subject to tremendous overturning moment. The joint means connecting the pipes are not rigid connection, which could cause problems in stiffness. And, the structure would be difficult to transport to wind farm site. Enabled by the comprised forms and features which are simultaneously constructed of cast-in-place concrete reinforced with rebars, the present foundation in contrast result in high capability to resist tremendous overturning moment loadings from tall superstructures. Deep embedded central hollow pier, continued grade beam with the continued shear key and arm grade beams which are comprised of the present foundation, particularly result in a surprisingly high capability of significantly reducing the gapping between soils and foundation caused by cyclic wind loadings.

U.S. Pat. No. 2,724,261 to E. M. Rensaa discloses a method attaching pre-cast concrete column to a supporting base, the diameter of the column is relatively small, and the base typically embeds in shallow subsurface. Obviously, the Rensaa's method is rather for construction, and the Rensaa's entire structure is not suitable for use as a large foundation for tall superstructure like wind turbine generators. In contrast, the present foundation is suitable to support tall superstructure enabled by comprised forms and features which are simultaneously constructed of cast-in-place concrete reinforced with rebars, and particularly with a surprisingly high capability of significantly reducing the gapping between soils and foundation caused by cyclic wind loadings.

U.S. Pat. No. 3,186,181 to R. K. Show et al. discloses a method and apparatus of filling the pile shells with concrete to address the problems caused by turbulent air that segregates the rocks from cement in long pile shells. The apparatus is a pre-compression chamber which hold the concrete from segregating and discharges the concrete to the bottom of the pile shells. The Show's invention is rather a construction method, not as the present foundation improves structure's engineering behavior by comprised forms and features, which are simultaneously constructed of cast-in-place concrete reinforced with rebars, and particularly with a surprisingly high capability of significantly reducing the gapping between soils and foundation caused by cyclic wind loadings.

U.S. Pat. No. 3,382,680 to T. Takano discloses a prestressed concrete pile section comprising a tubular body of concrete with a pair of annular mental discs at opposite ends. The invention provides a prestressed concrete pile or pile section which has an improved structure particularly designed to enable effective pre-tensioning of the axial reinforcement, which takes the form of reinforcing steel wires, and is high in structural strength. The prestressed axial reinforcing steel wires are bonded with concrete, and the steel wires have enlarged head to anchor to the steel ring embedded in concrete. Assembly the reinforcing system and applying prestress is cumbersome, and, the principles of the Takano's prestressed concrete pile is different from the present foundation, which comprises forms and features to improve the engineering behavior, particularly with a surprisingly high capability of significantly reducing the gapping between soils and foundation caused by cyclic wind loadings. Moreover, all structural members comprised in the present foundation utilize cast-in-place concrete reinforced with rebars, no reinforcements are pre-stressed.

U.S. Pat. No. 3,600,865 to F. Vanich discloses a single-column borne house erected and supported on a cast in place foundation pillar. The column is bolted to the pillar while beams are bolted to the column as cantilever beams. The foundation pillar is supported on a large diameter pile or insert into ground with a small pit which will be placed concrete with reinforcement. In contrast, the present foundation comprises features and forms to transfer and distribute the tremendous loadings to further and deeper ground, and particularly with a surprisingly high capability of significantly reducing the gapping between soils and foundation caused by cyclic wind loadings.

U.S. Pat. No. 3,842,608 to L. A. Turzillo discloses a method of installing a pile using screw-like means to drill the hole for the pile. Then cementitious material is then poured into the hole and forms a pile. The Turzillo's invention is rather a construction method. In contrast, the present foundation improves the engineering behavior by utilizing the comprised features and forms, particularly with a surprisingly high capability of significantly reducing the gapping between soils and foundation caused by cyclic wind loadings.

U.S. Pat. No. 3,963,056 to A. Shibuyya et al. discloses prestressed concrete piles, poles or the like. Pillar covered with an outer shell of steel pipe on a circumferential surface of a cylindrical prestressed concrete tube or a pillar-shaped prestressed concrete pole at least one end being in an independent state to the concrete article. The invention provides the joint effects of the good compressive strength of the said prestressed concrete tube or pole and the good bending strength by adding the outer shell. However, the outer steel shell filled with concrete can be regarded similarly as increasing in pile diameter. In contract, the present foundation improves structure's engineering behavior by comprised forms and features which transfers and distributes loadings to further and deeper ground, particularly with a surprisingly high capability of significantly reducing the gapping between soils and foundation caused by cyclic wind loadings. Moreover, the forms and features of the present foundation are constructed of cast-in-place concrete reinforced with rebars, no reinforcements are pre-stressed.

U.S. Pat. No. 4,228,627 to J. O'Neill discloses a reinforced foundation structure for supporting high light pole by using a plurality of vertically extending reinforcing rod assemblies with the top bolted to a base plate on the bottom of the pole. The structure extends downwardly into a vertical earth bore of relatively small diameter. Accordingly, the O'Neil structure is not capable of being used to support superstructure subject to high overturning moment or being placed under high unit compressive loading. In contrast, the present foundation improves structure's engineering behavior by utilizing comprised forms and features which transfer and distribute loadings to further and deeper ground, particularly with a surprisingly high capability of significantly reducing the gapping between soils and foundation caused by cyclic wind loadings.

U.S. Pat. No. 4,618,287 to F. Kinnan discloses a method for establishing in ground footings to support poles by using a threaded steel casing. The casing is threaded into ground, and grout is penetrated into the ground via the holes through the steel casing. The diameter of casing and the depth threaded into ground are relatively small. Accordingly, the Kinnan's structure is not capable of being used to support superstructure subject to high overturning moment or being placed under high unit compressive loading. The Kinnan's invention is rather a construction method. In contrast, the present foundation improves structure's engineering behavior by utilizing comprised forms and features to transfer and distribute loadings to further and deeper ground, particularly with a surprisingly high capability of significantly reducing the gapping between soils and foundation caused by cyclic wind loadings. The forms and features of the present foundation are constructed of cast-in-place concrete reinforced rebars, grout is not used to improve the existing ground.

U.S. Pat. No. 4,842,447 to J. J. Lin discloses a fabrication method and device for hollow reverse circulation piles. Firstly, a central hollow portion is installed with a movable sand barrel between which and the surrounding reinforcing cage, positioning device for movable sand barrel is installed. Upon start of work, grouting is poured to a scheduled height from the bottom of the pile bore first. Grouting is then poured between pile bore wall and outer wall of movable sand barrel. The Lin's invented construction method and device is expensive, and the construction process is less practical. In contrast, the present foundation improves structure's engineering behavior by utilizing comprised forms and features to transfer and distribute loadings to further and deeper ground, particularly with a surprisingly high capability of significantly reducing the gapping between soils and foundation caused by cyclic wind loadings. The forms and features comprised in the present foundation are simultaneously constructed of cast-in-place concrete reinforced with rebars, and no need for extra device for construction.

U.S. Pat. No. 5,228,806 to C. J. De Medieros et al. discloses a gravity pile for subsea platform foundations. The gravity pile comprises a series of pile sections made from two concentric tubes, the annular space between which is filled with an elevated specific weight composition. Individual pile sections can be joined together by means of tubular connecting rings welded to the ends of the sections and welded or screwed to each other. The Medieros' foundation is complicated in construction, and thus not cost-efficient. Moreover, the welding connecting the gravity piles is vulnerable to high fatigue, cyclic loadings provided by wind turbine generators. In contrast, the present foundation improves structure's engineering behavior by utilizing comprised forms and features to transfer and distribute loadings to further and deeper ground, particularly with a surprisingly high capability of significantly reducing the gapping between soils and foundation caused by cyclic wind loadings. The forms and features comprised in present foundation are constructed of cast-in-place concrete reinforced with rebars. The present foundation utilizes the resistance from further and deeper ground, not the self-weight of the structures.

U.S. Pat. No. 5,379,563 to C. R. Tinsley discloses an anchoring assembly by which heavy machinery may be anchored to a foundation. However, separate anchoring plates are used to fasten the anchors in lower and upper part. Such separate plates and anchors may have a risk to be pulled out when the overturning moment is large. Thus, the Tinsley's foundation is not capable of supporting superstructures such as wind turbine generators which subject to high overturning moment. In contrast, the present foundation is suitable to support tall superstructures. The present foundation improves structure's engineering behavior by utilizing comprised forms and features to transfer and distribute loadings to further and deeper ground, particularly with a surprisingly high capability of significantly reducing the gapping between soils and foundation caused by cyclic wind loadings. The forms and features of the present foundation are constructed of cast-in-place concrete reinforced with rebars, the embedment ring used in present foundation is intact, not separated, to ensure the pullout safety.

U.S. Pat. No. 5,586,417 to A. P. Henderson et al. discloses a hollow, cylindrical pier foundation is constructed of cementitious material poured in situ between inner and outer cylindrical corrugated metal pipe (CMP) shells. The foundation is formed by CMPs within a ground pit. External and internal spaces beyond the CMPs need to be backfilled. The anchoring system is adopted to bolt the base flange of superstructures to the foundation. In contrast, the present foundation does not use CMPs to form the foundation, it utilizes ground to shape and form the foundation, and no need to excavate a pit to place CMPs first and no excavation, backfill and compaction is needed. Moreover, the present foundation comprises forms and features to transfer and distribute the tremendous overturning moment loadings from tall superstructure to further and deeper ground, particularly with a surprisingly high capability of significantly reducing the gapping between soils and foundation caused by cyclic wind loadings, that the Henderson's invention and other mono-pier foundation does not have. The length of the bolts in present foundation are much shorter, and the reinforcements and concrete of the present foundation take the tensions, compressions, and the moments and the loadings are then transferred and distributed to further and deeper ground. More reinforcements are used in central hollow pier to keep it as a rigid body and the reinforcement usage decreases in continued grade beam and arm grade beams. The principle and the comprised forms and features of the present foundation are obviously different from Henderson's invention.

U.S. Pat. No. 5,826,387 to A. P. Henderson et al. discloses an upright cylindrical pier foundation is constructed of cementitious material. Compared with U.S. Pat. No. 5,586,417, the pier is similarly formed by the corrugated metal pipe (CMP) shells, while more rods are added and arranged radically to upper part of the system to ensure higher bearing capacity for high compression. Refer to comparisons between the present foundation with U.S. Pat. No. 5,586,417, the present foundation does not use CMPs to form the structural members, it utilizes ground to shape and form the foundation and no need to excavate a pit to place the CMPs, and no backfill and no compaction is needed. Moreover, the present foundation comprises forms and features to transfer and distribute the tremendous overturning moment loadings from tall superstructure to further and deeper ground, particularly with a surprisingly high capability of significantly reducing the gapping between soils and foundation caused by cyclic wind loadings. The principle and the comprised forms and features of the present foundation are obviously different from Henderson's invention.

U.S. Pat. No. 7,533,505 to A. P. Henderson discloses a circular concrete cap foundation poured in-situ within a perimeter formed by corrugated metal pipes (CMPs) which are set at top or within an excavated pit and enclose a series of circumferentially spaced pile anchors. The pile anchors are also formed with corrugated metal pipes (CMPs) which are set in deep subsurface soils and eventually poured with cementitious material. Refer to the comparisons with U.S. Pat. Nos. 5,586,417 and 5,826,387, the present foundation does not use CMPs to form, manufacture the comprised forms and features. The present foundation utilizes ground to shape and form the foundation and no need to excavate a pit to place CMPs, no backfill and no compaction is needed. Moreover, the present foundation comprises forms and features to transfer and distribute the tremendous overturning moment loadings from tall superstructure to further and deeper ground, particularly with a surprisingly high capability of significantly reducing the gapping between soils and foundation caused by cyclic wind loadings. The principle and the comprised forms and features of the present foundation are obviously different from Henderson's invention.

U.S. Pat. No. 7,987,640 to B. Oiigaard et al. discloses a technique preventing water intrusion into foundation by adding sealing compound and cover into foundation concrete. The technique is helpful to increase the lifetime of the foundation but not improving the mechanical behavior of the foundation by inventing forms and features.

U.S. Pat. No. 8,161,698 to P. G. Migliore discloses a circular foundation using fiber reinforced concrete with circular reinforcement rods. The foundation includes a vertical stanchion that rests on the bottom of an excavated hole with relatively large diameter, vertical anchor bolts and radical reinforcements are placed in the hole, and then concrete is poured into the hole. The invention essentially follows the principle of single pier foundation, adds a stanchion and radial reinforcement around the stanchion to strength the structures of the single pier. In contrast, the present foundation comprises forms and features to transfer and distribute the tremendous overturning moment loadings from tall superstructure to further and deeper ground, particularly with a surprisingly high capability of significantly reducing the gapping between soils and foundation caused by cyclic wind loadings.

U.S. Pat. No. 9,670,909 to N. Holscher discloses a foundation constructed with a plurality of concrete segments. The segments are pre-casted with curved surfaces, and two sheaths are preserved to install tensioned wires to connect the segments. In contrast, the present foundation comprises forms and features to transfer and distribute the tremendous overturning moment loadings from tall superstructure to further and deeper ground, particularly including the continued shear key built below the continued grade beam, which enables a surprisingly high capability of significantly reducing the gapping between soils and foundation caused by cyclic wind loadings. The present foundation is constructed of cast-in-place concrete reinforced with rebars, not using pre-casted segments tied up with tensioned wires.

Compared with our previous application (Application #16278010), the present invention has a much longer central hollow pier to provide more resistance by utilizing deeper ground. The continued shear key is built below the continued grade beam, which enables a surprisingly high capability of significantly reducing the gapping between soils and foundation caused by cyclic wind loadings, while solid piles used in our previous invention are not used in the present foundation.

Based on above comparisons with state-of-the-art technique in relation to the present foundation, it is finally concluded that the present foundation comprises different forms and features from above listed inventions.

SUMMARY OF THE INVENTION

The foundation of the instant invention is unique because the new foundation type is invented by imitating the shape and working mechanism of a tubular rivet. In summary, the relatively long central hollow pier imitates the cylindrical tubular shaft, whereas the continued grade beam, particularly with the continued shear key built below it, and the arm grade beams mimic the rivet head. All these members are embedded in ground and all connections for these structural members are fixed and rigid.

For a conventional concrete pier foundation, all loadings from superstructure are transferred and taken by the single pier and then the ground around the pier provides resistance to balance the loadings. This is similar for a conventional pile foundation.

For the present foundation, the central hollow pier elevates the foundation with a stickup and its plan configuration matches the base flange of superstructures. The central hollow pier embeds relatively deep in ground. It takes the loadings transferred from the superstructures, and continuously transfers and distributes the loadings further to the continued grade beam and the continued shear key built below it through the arm grade beams. The continued grade beam is utilized to link all structural members, and make them work together, certainly itself also provides resistances to the loadings.

The anchor bolt system, which is widely used in industry for wind turbine generator foundation, bolts the superstructure and foundation together, and transfer loadings from superstructure to the present foundation. Thus, the foundation is loaded by the structure supported therefrom, the unit is subjected to varying tensile and compressive loads, and the tensile and compressive loads form a coupled moment to resist the overturning moment transferred from tall superstructures. In the present foundation, the anchor bolts are approximately 6 feet long, which can make the embedment ring being placed at a lower position below the bottom of the arm grade beams. This length is much shorter than those typically used in other type foundations. However, resistance to pull-out loadings is ensured as the embedment ring is placed below the bottom of the arm grade beams. The more details related to mechanical analysis are described in the following paragraphs.

The tensile and compressive loads form a coupled moment that resists the overturning moment transferred from tall superstructures. More specifically, overturning moment loadings and dead weight of superstructures generate compressions on foundation top, where high-strength grouting material is used to prevent breaking of the foundation top concrete. In the meanwhile, overturning moment loadings also cause tensions in anchor bolts. The compression reaction from the high-strength grouting and the tension reaction from the anchor bolts form a coupled moment to resist the overturning moment loadings that the foundation subject. The coupled moment formed in central hollow pier will also be transferred to continued grade beam as well as the continued shear key through arm grade beams which tie up the central hollow pier, the continued grade beam as well as the continued shear key. Horizontal shear that superstructure subjects to is also transferred and distributed to the foundation. The central hollow pier takes the transferred shear and continuously transfers and distributes it similarly. Finally, all these loadings are transferred and distributed to further and deeper ground through the comprised forms and features of the present foundation.

The invention is initially inspired by a tubular rivet and its working mechanism, but the above description for mechanical analysis of the present follows the principles of soil mechanics as well as the loading distribution among rigid, fix-connected structural members. Earth pressure acts on the structural members of the present foundation as they are embedded in ground. The magnitude and directions of earth pressure depend on displacement of the structural members and the embedment depth. Moreover, earth pressure interacts with the structural members and offsets the loadings transferred and distributed.

The design engineers are familiar with the forms and features that the present foundation comprised. A bunch of standards/codes that the design shall comply with are available. The design is thus conventional and not challenging. Following the principles of loading distribution among structural members and soil mechanics for embedded engineering structures, the usage of reinforcements should follow a decreasing order from the central hollow pier, arm grade beams, continued grade beam and the continued shear key built below the continued grade beam. Hand calculations can provide close-form solutions for design use, while 3-D geotechnical and structural design and analysis software is better as they can provide more accurate solutions.

No special construction equipment is needed. Typical and widely-used construction equipment and construction procedure can be used to construct the present foundation. Moreover, since formworks as well as excavation, backfilling and compaction are not needed, the construction procedure is simplified, and the construction time is saved. Since the total footprint of the structural members is relatively small, the removal of the earth surface vegetation is relatively small, and thus, the present foundation is environment-friendly.

Finally, the present invention to be specifically enumerated herein is to provide a tubular rivet-like foundation in accordance with the proceeding forms and features of manufacture, be of simple construction, cost-efficient, environment-friendly, constructible and suitable to most subsurface conditions. All technical requirements from superstructures are more easily to be satisfied, the forms and features of the foundation comprises are economically feasible, durable, reliable and cost-efficient. Compared with industry-widely used invert T-type spread foundation under the same loadings with the same site conditions, approximately 40% of construction cost can be saved if the present foundation constructed accordingly.

These together with other objects and advantages which will become subsequently apparent reside in the details of construction and operation as more fully hereinafter described and claimed, reference being had to the accompanying drawings forming a part hereof, wherein like numerals refer to the like parts throughout.

BRIEF DESCRIPTION OF THE DRAWINGS

FIG. 8 clearly illustrates how these structural members connect to each other and how to arrange the reinforcements during construction in accordance with the present foundation.

Designations for the numerals FIGS. 2, 3, 4, 5, 6, 7 and 8 are as follows:
1—Central Hollow Pier; 2—Arm Grade Beams; 3—Continued Grade Beam; 4—Continued Shear Key; 5—Tower Flange; 6—Grouting Trough; 7—Anchor Bolts; 8—PVC Wrap; 9—Embedment Ring; 10—Washers; 11—Nuts; 12—Concrete; 13—Longitudinal reinforcements of Central Hollow Pier; 14—Hooping of Central Hollow Pier; 15—Longitudinal Reinforcements of Arm Grade Beams; 16—Hooping of Arm Grade Beams; 17—Hooping of Continued Grade Beam and Key; 18—Longitudinal Reinforcements of Continued Grade Beam and Key; 19—Preserved Holes in Flange; 20—Predrilled Holes in Embedment Rings.

DESCRIPTION OF THE PREFERRED EMBODIMENTS

Figure 1:
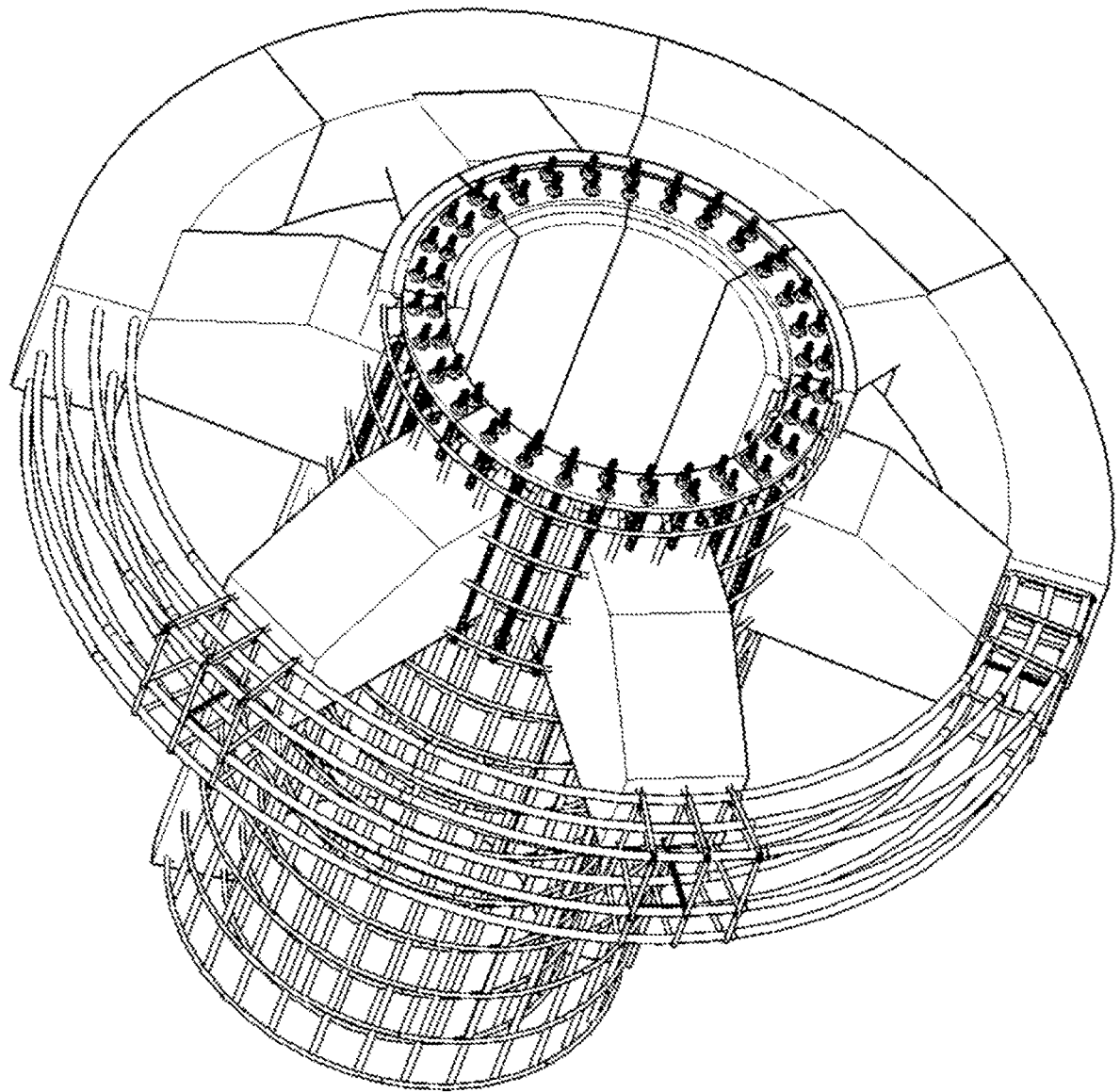
FIG. 1 is a 3-D illustration of the invented foundation. The foundation is completed constructed in accordance with the preferred embodiments of the present invention. The surrounding soil and rock masses are omitted in the sketch so the forms and features can be seen clearly, and the invented foundation is skewed in order to show the foundation embodiment clearly. Four structural members, one relatively long central hollow pier, several arm grade beams, one continued grade beam and a continued shear key built below it, are clearly shown in FIG. 1. Reinforcements for different structural members are also partially shown in FIG. 1.
Figure 2:
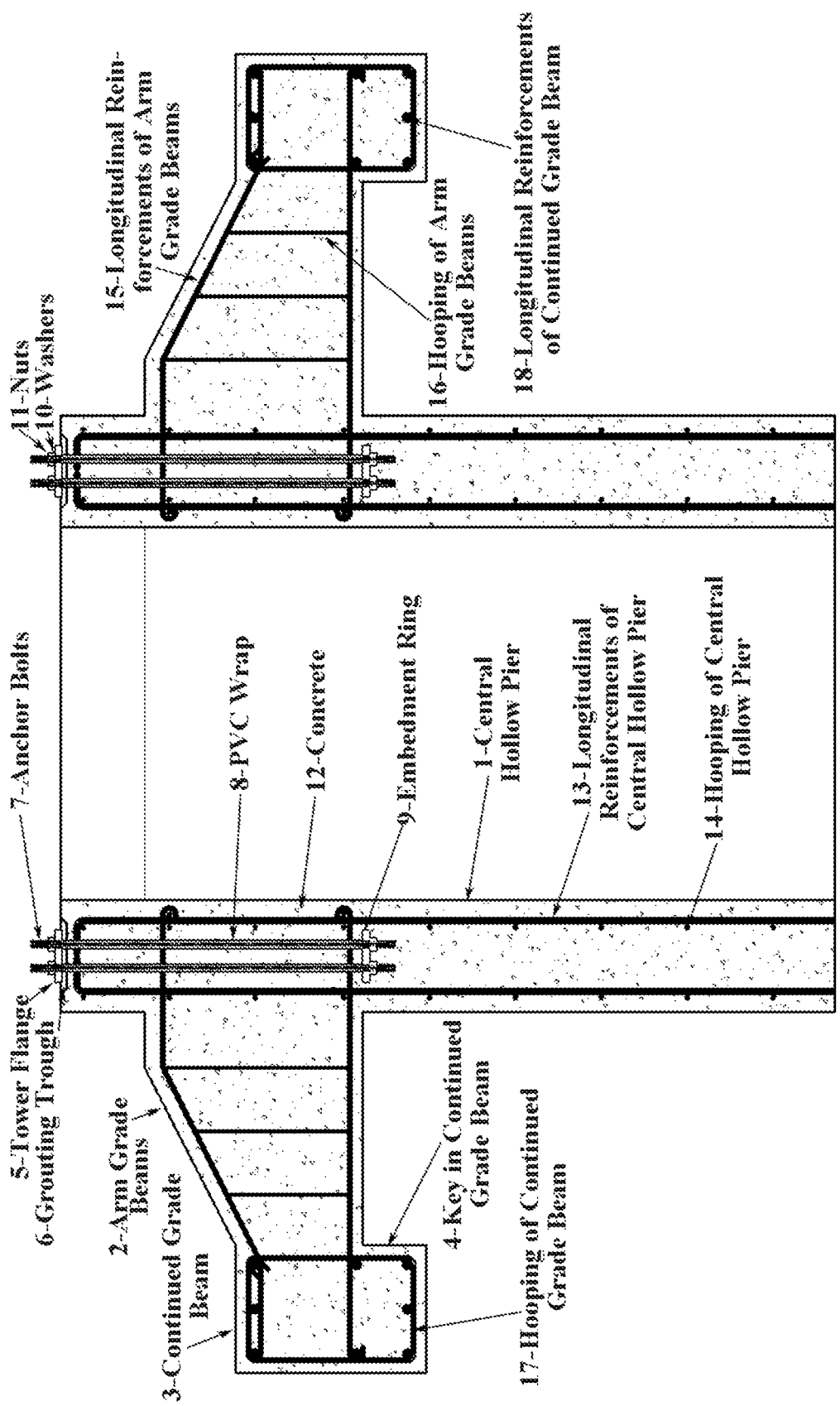
FIG. 2 is a vertical sectional view of the invented foundation, illustrating the arrangements for the four major structural members constructed in accordance with preferred embodiments. Concrete, anchoring system including base flange, embedment ring, washers and nuts as well as reinforcements are also shown in FIG. 2.

Referring specifically to the drawings, FIG. 1 is a 3-D illustration for the present foundation, and FIG. 2 designates the top plan view of the invented foundation. FIGS. 2 to 8 show the details for the foundation. FIG. 2 designates a vertical sectional view of the foundation, the numerals in FIG. 2 show that the foundation comprises four major structural members, central hollow pier 1, arm grade beams 2, continued grade beam 3, and continued shear key 4 built below the continued grade beam 3. The configuration of the central hollow pier 1 matches the tower base flange 5, which is also shown on FIGS. 1 and 2. The inner and outer diameters of the central hollow pier 1 typically range from 10 feet to 16 feet for wind turbine generator foundation to accommodate the base flange 5 which sits in the grouting trough 6 shown in FIG. 2. The grouting trough 6 is constructed as a groove on the top of the central hollow pier 1. The depth of the grouting trough 6 typically ranges 2 to 5 inches, and its width and diameters depend on the tower base flange 5. The embedment depth of central hollow pier 1 typically ranges from 25 feet to 40 feet to fully utilizes the resistance in deeper ground, also works as a hub to transfer and distribute the loadings further and deeper to continued grade beam 3 and the continued shear key 4 through arm grade beams 3.

Figure 3:
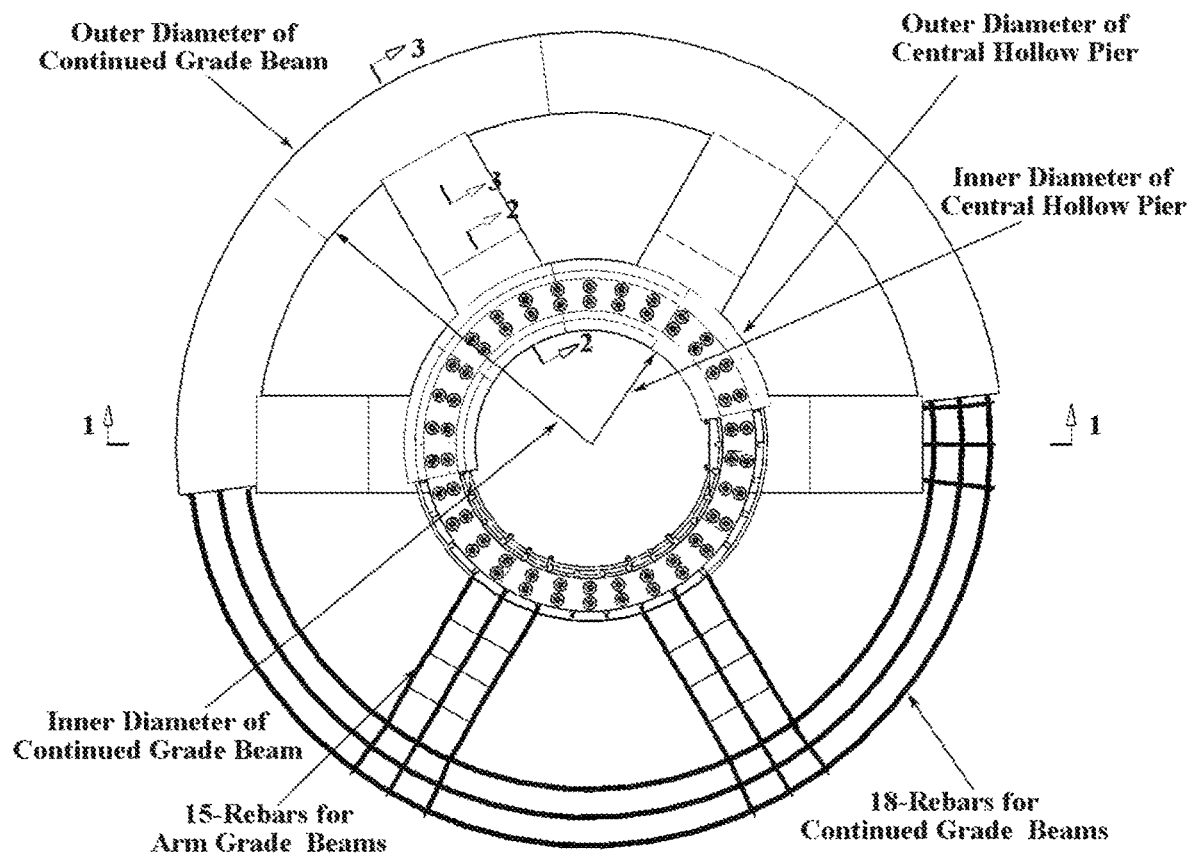
FIG. 3 is a top plan view of the invented foundation. Four major structural members and their geometry relationship are illustrated in FIG. 3.

FIG. 3 shows the geometric relationships of the structural members of the present foundation. It clearly shows that the diameter of the continued grade beam 3 is larger than that for central hollow pier 1. Arm grade beams 2 are used to link the central hollow pier 1 with continued grade beam 3, mechanically they will transfer and distribute the loadings. Continued shear key 4 is not shown in FIG. 3 as it is hidden by the continued grade beam 3.

Figure 4:
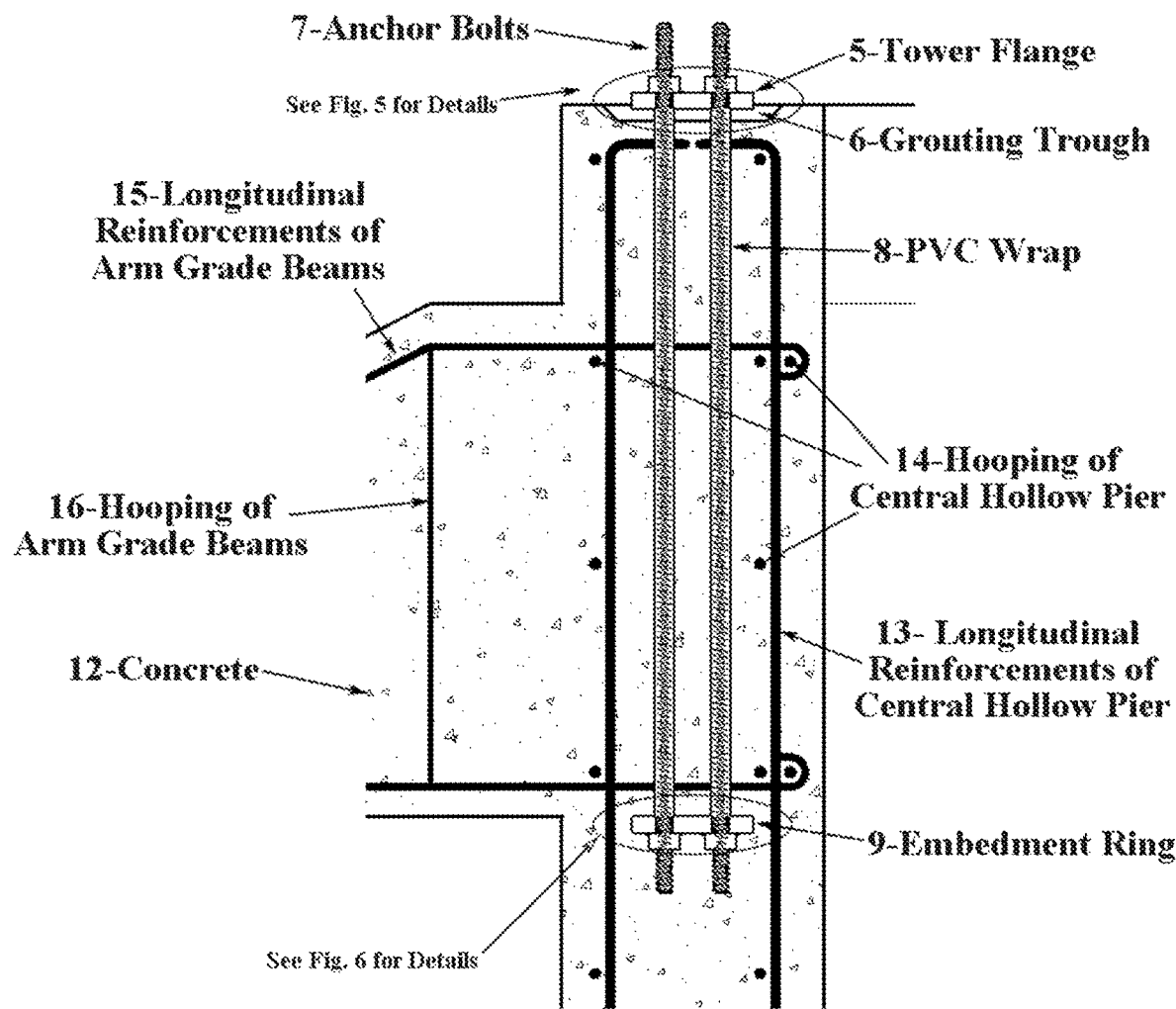
FIG. 4 shows the detail for vertical sectional view of the central hollow pier and reinforcement arrangements. Anchoring system, including base flange, the anchor bolts, PVC wrap, embedment ring as well as washers and nuts assembled in accordance with the present foundation are illustrated.
Figure 5:
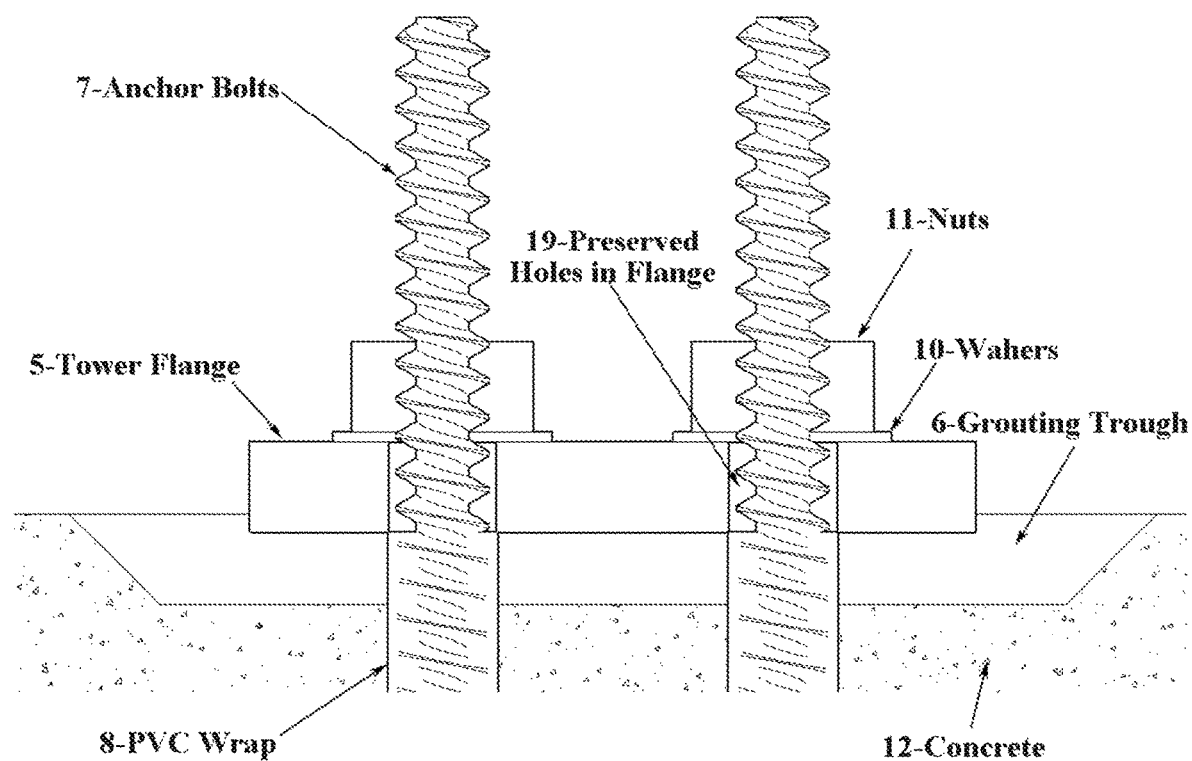
FIG. 5 shows the detail for vertical sectional view of anchor bolts and base flange, illustrating the anchor bolts, PVC wrap and base flange, connected and fastened with washers and nuts assembled in accordance with the present foundation.
Figure 6:
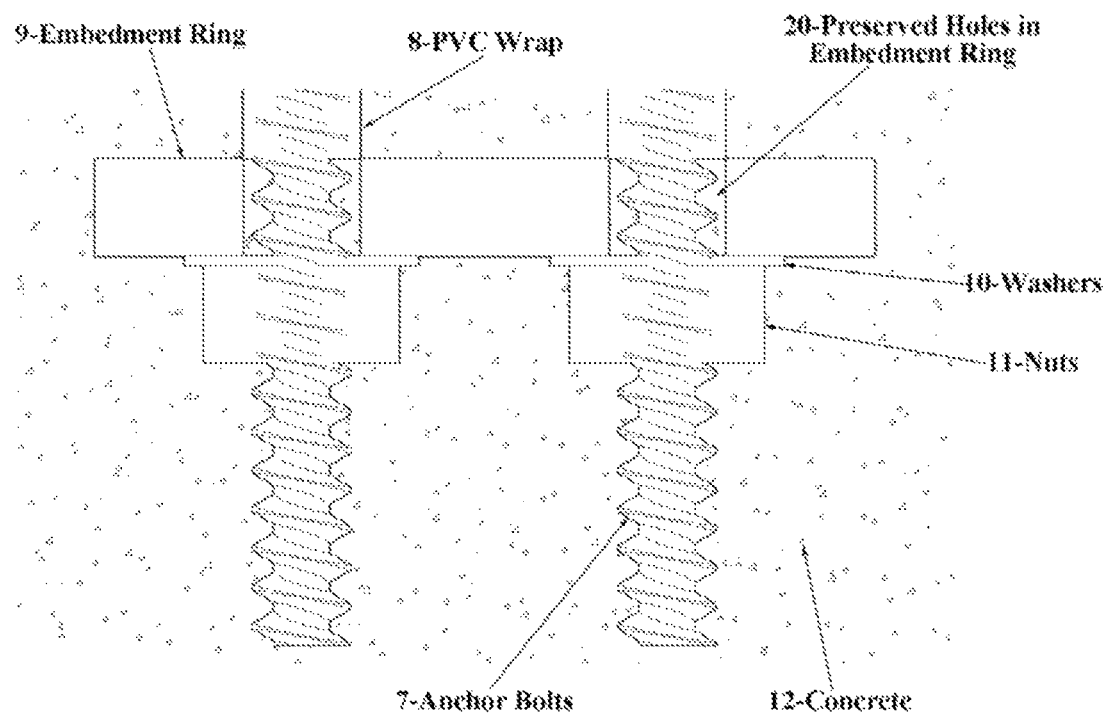
FIG. 6 shows the detail for vertical sectional view of anchor bolts and embedment ring, illustrating the anchor bolts, PVC wrap and Embedment Ring connected and fastened with washers and nuts assembled in accordance with the present foundation.

As shown in FIG. 2 and FIG. 4, the central hollow pier 1 contains a series of reinforcements, including 13 designating the longitudinal reinforcements for central hollow pier 1 and 14 designating the hooping for central hollow pier 1. Arm grade beams 2 connect to the central hollow pier 1, thus the longitudinal reinforcements designated by numeral 15 for arm grade beams 2 are extended into the central hollow pier 1. The longitudinal reinforcements 13 are curved inwardly at the top and the bottom of the central hollow pier 1 to provide more pull-out resistance capacity for the anchoring system. The hooping for central hollow pier 1 designated by numeral 14 uses curved steel bars, arranged with 4 or 5 layers, and tie up with the longitudinal reinforcements 13. The anchoring system is also shown in FIGS. 2 and 4, while more details are shown in FIGS. 5 and 6. The anchoring system comprises of tower base flange 5, embedment ring 9, anchor bolts 7, PVC wrap 8, washers 10, and nuts 11. The tower base flange 5 sits in grouting trough 6, the embedment ring 9 is placed within the central hollow pier 1 and embeds in the concrete 12 on a location below the bottom of the arm grade beams 2. The anchor bolts 7 are assembled through and within the reinforcements, and the PVC wrap 8 is used to separate the anchor bolts 7 from concrete 12. Washers 10 and nuts 11 are placed above the base flange 5 and below the embedment ring 9, respectively. Anchor bolts 7 pass through the holes 19 preserved in base flange 5, and the holes 20 predrilled in embedment ring 9. Post-tension on anchor bolts 7 can be applied by fastening the nuts 11 after concrete 12 hardens to a designed strength.

Figure 7:
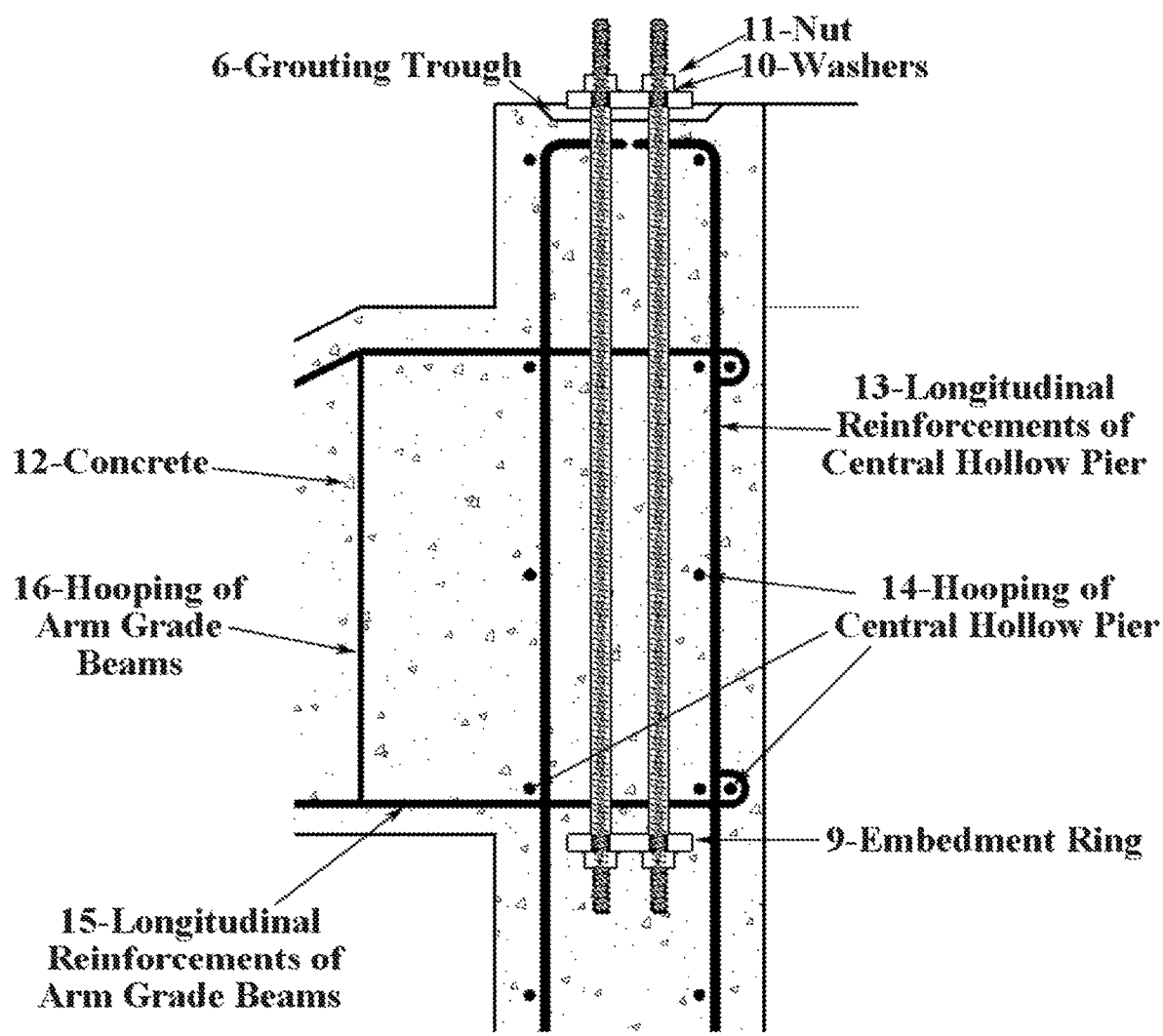
FIG. 7 shows the details for 3-D illustration and sectional view for connection details for arm grade beams to central hollow pier with reinforcement arrangements. How these structural members connect to each other and how to arrange the reinforcements during construction in accordance with the present foundation are clearly illustrated.

FIG. 7 shows the connection details for arm grade beams 2 and the central hollow pier 1 as well as the reinforcement arrangements. Longitudinal reinforcements designated by numeral 15 for arm grade beams 2 extend into the central hollow pier 1 and hook with the hooping, designated by numeral 15, for central hollow pier 1. The hooping for central hollow pier 1, designated by numeral 14, are placed inwardly and tie up with the longitudinal reinforcements, designated by the numeral 13, for central hollow pier 1. Reinforcements represented by numeral 13 extend from the top to the bottom of the central hollow pier 1.

Figure 8:
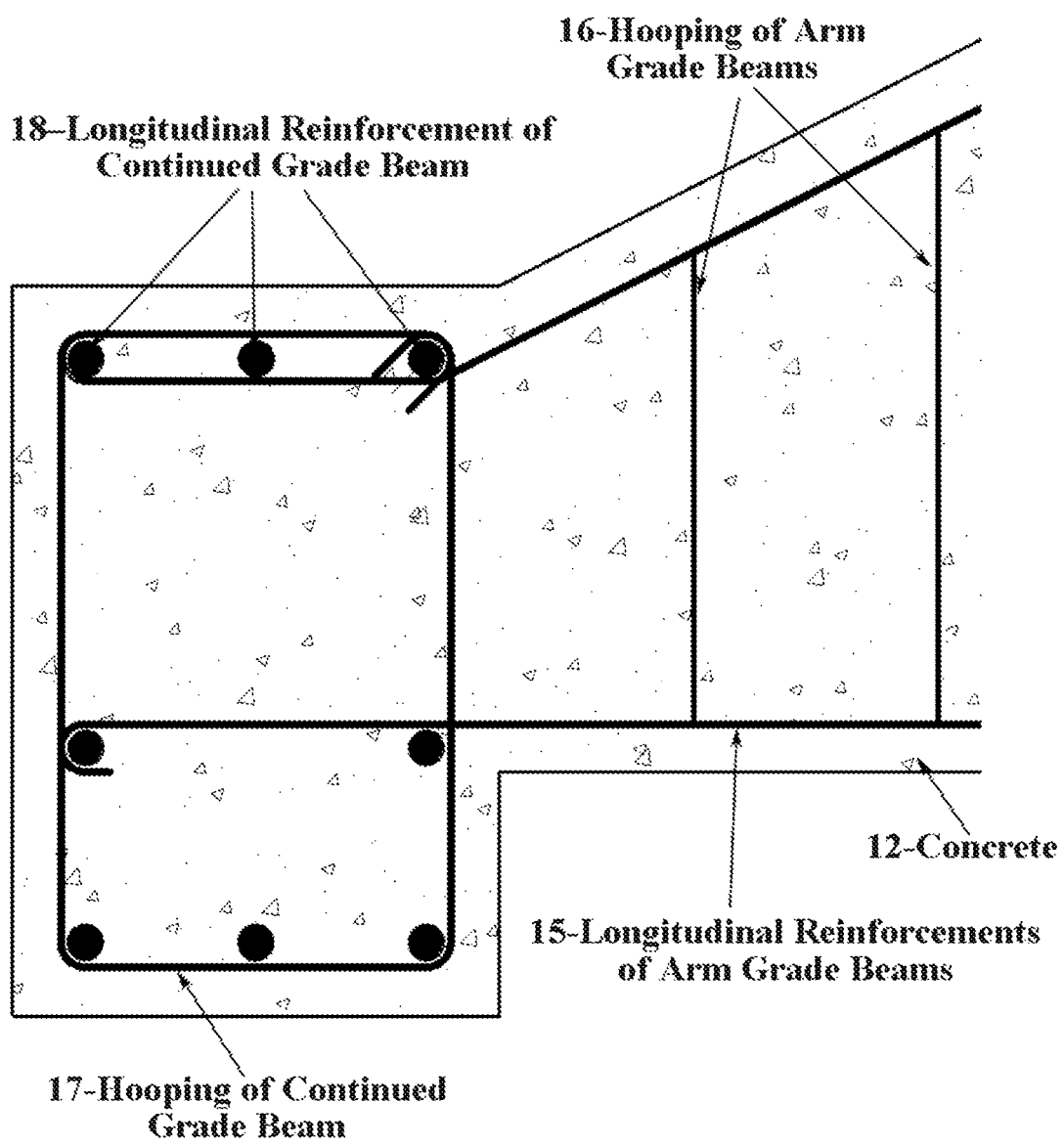
FIG. 8 shows the details for 3-D illustration and sectional view for connection details of arm grade beams to continued grade beam and the continued shear key built below it as well as reinforcement arrangements for these structural members.

FIG. 8 shows the connection details for arm grade beam 2, continued grade beam 3 and the continued shear key 4 built below the continued grade beam 3, as well as the reinforcements arrangements. The length of arm grade beams 2 typically adopts 15 to 25 feet with a varied section. The top of the arm grade beams 2 levels with existing grade at the end near the central hollow pier 1, while slopes down and embeds into ground from approximately 3 feet from the wall of the central hollow pier 1. The top of the continued grade beam 3 matches the top of the arm grade beams 2, while the bottom of the continued grade beam 2 embeds into ground about 1 foot deeper, and this deeper embedment of the continued grade beam 3 forms the continued shear key 4.

The following construction steps are for illustrative purpose only, and may be adjusted in accordance with the project conditions:

1. Level the construction site. Delineate the locations for the above mentioned four major structural members 1, 2, 3 and 4.
2. Fabricate reinforcement for central hollow pier 1, arm grade beams 2, continued grade beam 3 and the continued shear key 4 per design drawings.
3. Assembled embedment ring 9 and anchor bolts 7. A template ring may be needed to ensure the anchor bolts 7 positioning accurate and vertical.
4. It is ideal to assemble the embedment ring 9 and anchor bolts 7 within reinforcements for central hollow pier 1 prior to place reinforcements for central hollow pier 1 to the trench described below.
5. Excavate trenches for the central hollow pier 1, arm grade beams 2, continued grade beam 3 and continued shear key 4 using backhoe or other trenching equipment. Bentonite slurry may be needed during trenching to prevent caving when subsurface geomaterial are sands.
6. Set up auxiliary equipment such as pullies/cranes. The equipment will be used to stabilize the embedment ring 9 and anchor bolts 7 in central hollow pier 1, and to place reinforcements to the excavated trenches.
7. Prior to reinforcement placement, trenches may need tap water to recycle the slurry out to ensure no mud bonds to the reinforcement if slurry is used to prevent caving per industry-related standards.
8. Using the auxiliary equipment such as pullies/cranes to place reinforcements in the trench for central hollow pier 1.
9. Place embedment ring 9 and anchor bolts 7 within the reinforcements for central hollow pier 1. If the embedment ring 9 and anchor bolts 7 are assembled within reinforcements for central hollow pier 1, skip this step.
10. Using tremie pipe to place concrete 12 from the bottom of the central hollow pier 1. Prior to placement for concrete 12, ensure all reinforcements, embedment ring 9 and anchor bolts 7, as well as apparatus and/or preserved conduits for electrical cables/wires, are in right position.
11. When concrete 12 poured in the trench for central hollow pier 1 almost reach the bottom of the arm grade beam, using the auxiliary equipment such as pullies/cranes to place reinforcements in the trench for arm grade beams 2, continued grade beam 3 and the continued shear key 4.
12. Place concrete 12 to the trenches in the trench for arm grade beams 2, continued grade beam 3 and the continued shear key 4, continue to place concrete 12 in Central Hollow Pier 1.
13. Step 12 can be proceeded one by one, not necessary to proceed together, but the time for concrete placement shall comply with industry standards to avoid cold joints.
14. Place two concentric steel cases to the concrete surface poured in central hollow pier 1, which to be used to shape the foundation stickup. The outer steel case should have a "door" which is used to pass though the possible steel strings being used to hang the template ring and anchor bolts 7, as well as reinforcements for central hollow pier 1.
15. Place concrete to the two concentric steel cases to form stickup for foundation.
16. Restore on-site soils above the structural members per design; disassembly and move the steel cases out, clean them to prepare for the next foundation.
17. Cure placed concrete 12 by keeping the restored fill moistured or using other measures to cure the poured concrete 12.
18. When concrete at the top of the pier 1 are hardened, install the flange of superstructure to the grout trough 6, level the base flange 5 and ensure the anchor bolts 7 vertical.
19. Grouting the grout trough 6.
20. Move the auxiliary equipment to the next foundation and repeat the steps for next foundation.

The above description uses examples to disclose the invention, and also to enable any person skilled in the art to practice the invention, including making and using any forms and features and performing any incorporated methods, all the dimensions for the four major structural members and the reinforcement shape, size and grade are determined by design analysis and detailed in design phase. The construction steps described above are duly for further clarification for construction of the invented foundation, the construction steps may be adjusted and optimized per project conditions. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A foundation for supporting a superstructure, the foundation comprising:
   a central hollow pier, a set of evenly and radially arranged arm grade beams connected to the central hollow pier and having outer ends away from the pier, and a continuous grade beam connected circumferentially to the arm grade beam outer ends,
   wherein the central hollow pier has a circumferential thickness for affixing a base flange of the superstructure,
   wherein the central hollow pier has (i) a surface section above the set of arm grade beams for exposing the foundation above a ground surface and (ii) an embedment section below the set of arm grade beams for embedding the foundation beneath the ground surface to utilize ground resistance,
   wherein a portion of the continuous grade beam protrudes below the set of arm grade beams to form a continuous shear key for embedding the continuous grade beam deeper in the ground than the set of arm grade beams.

2. The foundation of claim 1, wherein each arm grade beam in the set of arm grade beams has a varying section, wherein a top of the set of arm grade beams slopes down from a point approximately 3 feet from a wall of the central hollow pier,
   wherein the varying section of each arm grade beam in the set of arm grade beams is sloped relative to a length of the arm grade beam.

3. The foundation of claim 1,
   wherein the continuous grade beam has a rectangular cross section.

4. The foundation of claim 1, wherein the foundation is constructed of cast-in-place concrete reinforced with rebars,
   wherein a set of connections for the central hollow pier, the arm grade beams, the continuous grade beam, and the continuous shear key are fixed.

5. The foundation of claim 1, wherein the embedment section has a depth that ranges from 25 feet to 40 feet.

6. The foundation of claim 1, wherein rebars used to construct the continuous grade beam protrude below rebars of the arm grade beams to form the continuous shear key.

* * * * *

UNITED STATES PATENT AND TRADEMARK OFFICE
CERTIFICATE OF CORRECTION

PATENT NO. : 10,738,436 B1  
APPLICATION NO. : 16/278037  
DATED : August 11, 2020  
INVENTOR(S) : Dongyuan Wang, Jing Lil and Ying Han Page 1 of 1

It is certified that error appears in the above-identified patent and that said Letters Patent is hereby corrected as shown below:

On the Title Page

Assignee information (item (73)) should be removed.

Signed and Sealed this
Twenty-fourth Day of November, 2020

Andrei Iancu
*Director of the United States Patent and Trademark Office*